No. 629,677. Patented July 25, 1899.
J. H. GLEW.
MEANS FOR SECURING TIRES TO VEHICLE WHEELS.
(Application filed Apr. 4, 1899.)
(No Model.) 3 Sheets—Sheet 1.

No. 629,677. Patented July 25, 1899.
J. H. GLEW.
MEANS FOR SECURING TIRES TO VEHICLE WHEELS.
(Application filed Apr. 4, 1899.)
(No Model.) 3 Sheets—Sheet 2.

Witnesses
Inventor
John H. Glew
By James L. Norris

THE NORRIS PETERS CO., PHOTO-LITHO., WASHINGTON, D. C.

No. 629,677. Patented July 25, 1899.
J. H. GLEW.
MEANS FOR SECURING TIRES TO VEHICLE WHEELS.
(Application filed Apr. 4, 1899.)
(No Model.) 3 Sheets—Sheet 3.
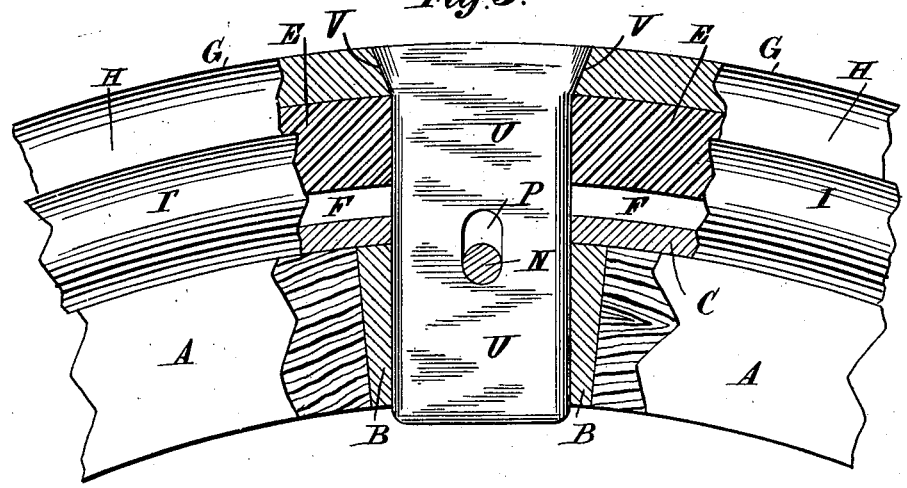
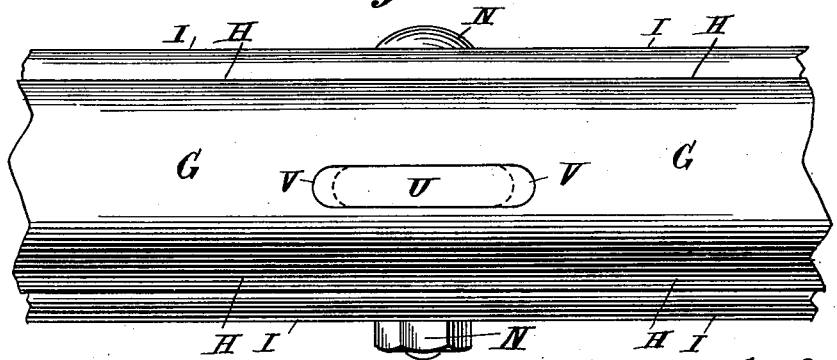
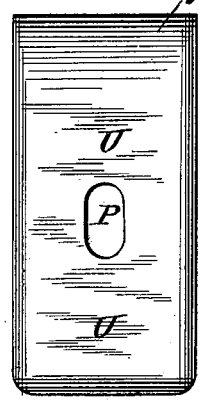
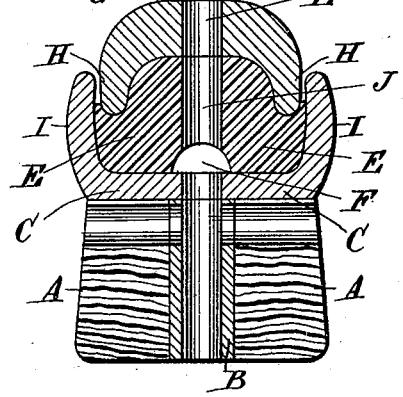
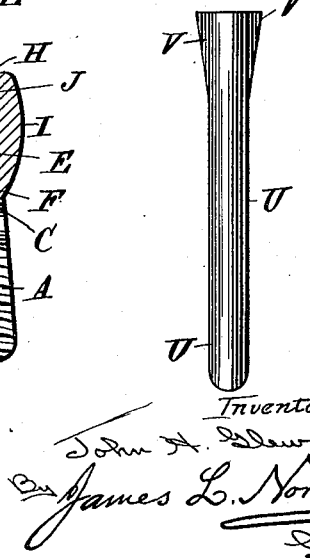
Witnesses
Inventor
John H. Glew
By James L. Norris

UNITED STATES PATENT OFFICE.

JOHN HENRY GLEW, OF LONDON, ENGLAND.

MEANS FOR SECURING TIRES TO VEHICLE-WHEELS.

SPECIFICATION forming part of Letters Patent No. 629,677, dated July 25, 1899.

Application filed April 4, 1899. Serial No. 711,684. (No model.)

*To all whom it may concern:*

Be it known that I, JOHN HENRY GLEW, a subject of the Queen of Great Britain, residing at Albion Works, Valmar road, Camberwell, London, England, have invented certain new and useful Improvements in Appliances or Means for Securing Resilient Tires on Road-Vehicle Wheels, of which the following is a specification.

This invention relates to improved appliances or means for securing resilient tires on road-vehicle wheels.

For the purpose of this invention I take an ordinary U shape of metal, as the sheathing or tire proper to a rubber-lined rim, which with a metal base and the wooden felly constitute a tire of a wheel. The sheathing may be in length and bent to circular form. Each end of this length I prepare with a slot and a widened hole from each side of the slot for the reception of a key of tapered-wedge formation to be passed into the adjoining slots and holes of the two ends when brought together to enable the ends to be drawn tight and close up. The tail portion of this wedge is sufficiently deep to pass through the rubber liner and the rim and felly with a socket, the tailpiece being perforated for the reception of a bolt passed into the felly crosswise the socket and the tailpiece, respectively. The perforation is of elongated form to allow for slight play while the wheel is traveling. This is a simple mode of preventing resilient tires of road-vehicles from creeping, as well as a ready means for securing the sheathing to the wheel, but there may be an additional slot in some other part of the sheathing for a plain wedge or other key to be similarly bolted to divide or reduce any strain that might be thrown upon wedge and tightening-key before referred to.

My invention is clearly represented on the annexed drawings.

Figure 1:
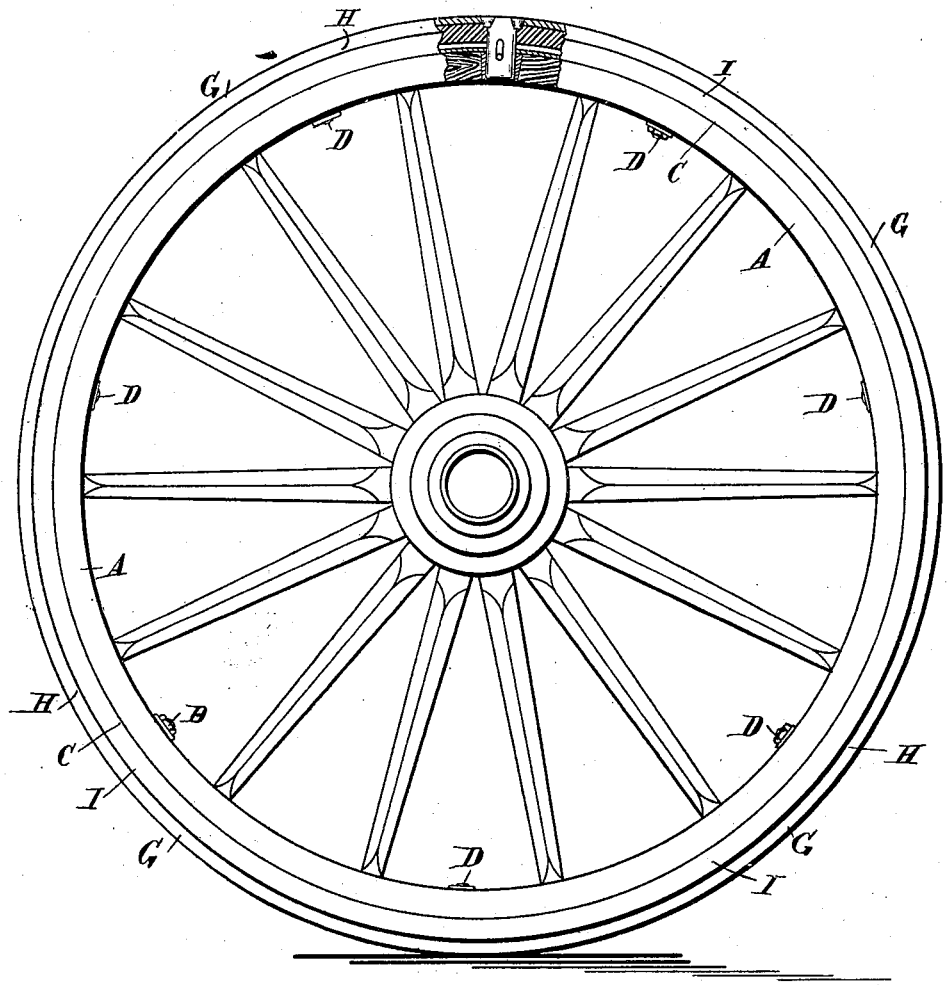
Figure 2:
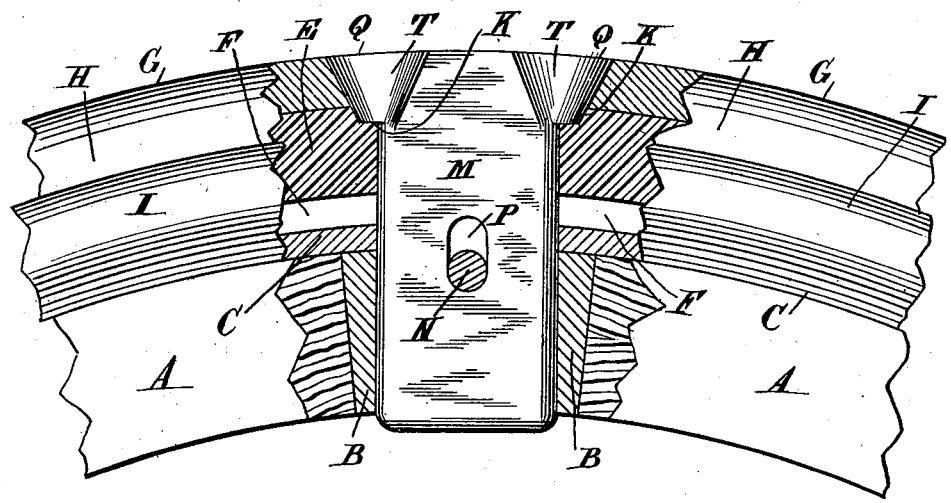
Figure 3:
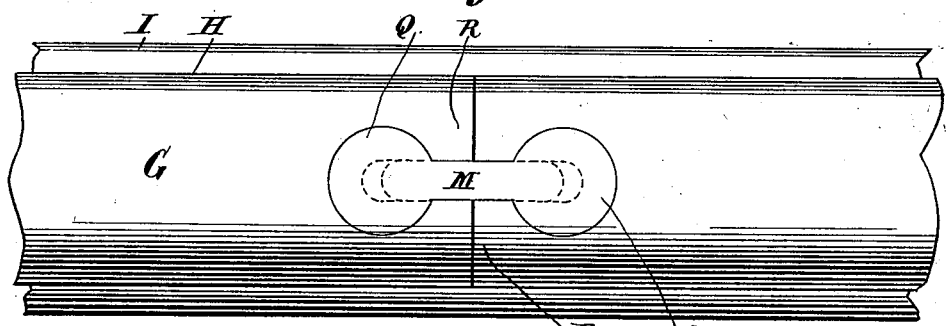
Figure 4:
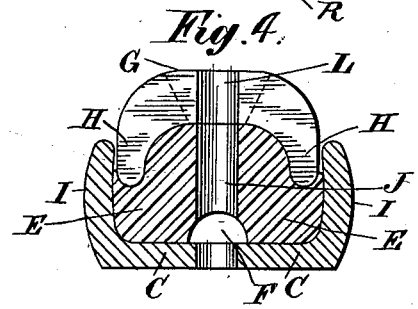

Figure 1 is a front elevation of a wheel with my invention, portion partly in section; Fig. 2, a part sectional elevation of that part of a wheel where the two ends of a sheathing-tire meet and having the key in position; Fig. 3, a plan of same; Fig. 4, a cross-section of rim and rubber and showing one end of the sheathing; Fig. 5, a part sectional elevation of, say, the opposite half-circumference of a tire of my invention; Fig. 6 a plan, and Fig. 7 a cross-section; Figs. 8 and 9, a face view and an edge view of key for same.

Referring to Figs. 1, 2, and 3, A is wood felly; B, metal socket dropped in slot formed in the felly; C, rim of trough or gutter shaped metal bar rolled or bent into ring shape and welded up in the ordinary manner, shrunk on and secured to felly A by bolts or rivets D; E, rubber liner molded to shape to fit into the chanel-groove of the rim and having groove F in its base to allow for compression of the rubber due to the load carried in a vehicle to which a wheel having the invention applied is fitted; G, shield or tread-ring also of trough or gutter shape, but reversed in position to that of the rim C for the wings or webs H to lodge within and be guided by the wings or webs I I of the rim C and also to prevent side play should the wheel strike or be forced sidewise against the curb of a roadway; J, slot in rubber liner E; K K, steps in rubber liner; L L, notches in ends of tread or shield G; M, key for fitting the keyways or slots in shield G and rubber liner E and bearing on steps K K. Said key also fits slot in socket B, where by a cross-bolt N passed through the felly A the several parts are held in place. The hole P in the key M is elongated vertically to permit of compression of the rubber liner E due to the load carried as that part of the wheel comes in contact with the ground in its revolution. The head Q of the key M is shaped circumferentially to that of the wheel-shield G to be flush therewith, and each end of the head is cone-shaped to fit corresponding openings near the meeting ends R R of the shield G, the extreme ends of the shield having a notch L for the plain part of the key-head to lodge in. In practice the shield is bent to fit over the molded rubber liner E, and as the meeting ends R R of the shield are brought together and the key M inserted the cone-shaped ends T T fit the correspondingly-shaped openings of the shield G and draw and retain the meeting ends in close contact, and so preserve the continuity of the shield G.

I have described the invention as if a single shield only were fitted over the rubber liner; but it may be in two or more strips bent to fit the rotundity of the wheel, as tread-strips thereto, in which case each end of each strip would be similarly prepared and additional keys U employed in the same manner for retaining them on the wheel. If a single ring-shield only be provided, the shield G, the rubber liner E, and the felly A, with a socket B, can be prepared for the reception of a plain flat-stemmed key U, as represented at Figs. 6 and 7 of the drawings, in which case I extend the head of the key U, as at V V, to fit the cone-shaped end of the slot in the shield G, or said slot may have chamfered sides for the reception of the head of the key shown at Figs. 8 and 9.

What I claim, and desire to secure by Letters Patent, is—

1. A wheel-tire for a road-vehicle consisting of wood felly A, trough-shaped base-ring C surrounding the felly, rubber liner E in said base, shield G with webs H fitting within the webs I of the base C, cone-shaped holes near the meeting ends R, R, of said shield for correspondingly-shaped ends T, T, of a key M, notches L, L, in extreme ends R, R, of shield G for flat part Q of key-head, cross-bolt N, all arranged as specified.

2. A wheel-tire for a road-vehicle consisting of wood felly A, socket B, base-ring C, rubber liner E, shield G, with webs H within webs I, I, of base-ring C, slot through felly A, rubber liner E, key M, cross-bolt N in vertically-elongated hole P of key M, cone-shaped ends T, T, of key-head Q, cone-shaped openings next to notches of shield ends R, R, all as specified.

3. The combination with a felly with socket, and a base with webs, of a liner, a shield with webs extending oppositely to those of the base, a wedge-headed key passed through slots in the shield, lines and base and through the socket of the felly, and a cross-bolt passed through a hole in the said key, substantially as described.

In testimony whereof I have hereunto set my hand in presence of two subscribing witnesses.

JOHN HENRY GLEW.

Witnesses:
HENRY GARDNER,
RICHARD CORE GARDNER.